(12) United States Patent
Santa Cruz et al.

(10) Patent No.: US 6,332,430 B1
(45) Date of Patent: Dec. 25, 2001

(54) AQUARIUM ACCESSORY DEVICE

(76) Inventors: Cathy D. Santa Cruz, 7630 Tholl Dr., Reno, NV (US) 89506; Laura J. Sperry; Ronald E. Sperry, both of 3050 E. Lake Blvd., Carson City, NV (US) 89704

( * ) Notice: Subject to any disclaimer, the term of this patent is extended or adjusted under 35 U.S.C. 154(b) by 0 days.

(21) Appl. No.: 09/499,251

(22) Filed: Feb. 7, 2000

(51) Int. Cl.[7] .................................................. A01K 63/00
(52) U.S. Cl. .......................................... 119/256; 119/253
(58) Field of Search ...................................... 119/256, 246, 119/247, 248, 253; D30/104, 106; 40/650, 649, 661

(56) References Cited

U.S. PATENT DOCUMENTS

| | | | |
|---|---|---|---|
| D. 357,704 | * 4/1995 | Wolff | D19/90 |
| 3,086,658 | * 4/1963 | Palmer . | |
| 3,618,238 | * 11/1971 | Willinger . | |
| 3,730,138 | * 5/1973 | Suchowski | 119/253 |
| 3,956,837 | * 5/1976 | Itano . | |
| 4,144,664 | * 3/1979 | De Korte | 40/609 |
| 5,067,059 | * 11/1991 | Hwang | 362/101 |
| 5,078,093 | * 1/1992 | Flaherty . | |
| 5,365,884 | * 11/1994 | Jones | 119/256 |

* cited by examiner

*Primary Examiner*—Charles T. Jordan
*Assistant Examiner*—Yvonne R. Abbott

(57) ABSTRACT

An aquarium accessory device which when installed within an aquarium substantially functions as an aesthetically pleasing blind for concealment of unsightly algae covered items. Such items may include typical water filters, heaters, etc.

7 Claims, 3 Drawing Sheets

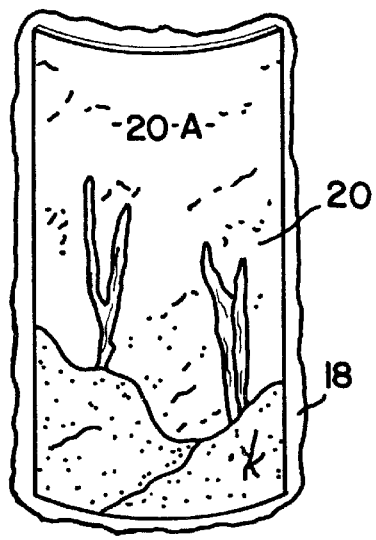
FIG. 3
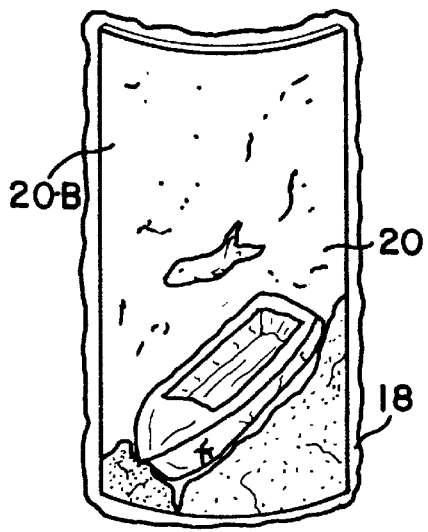
FIG. 4
FIG. 5
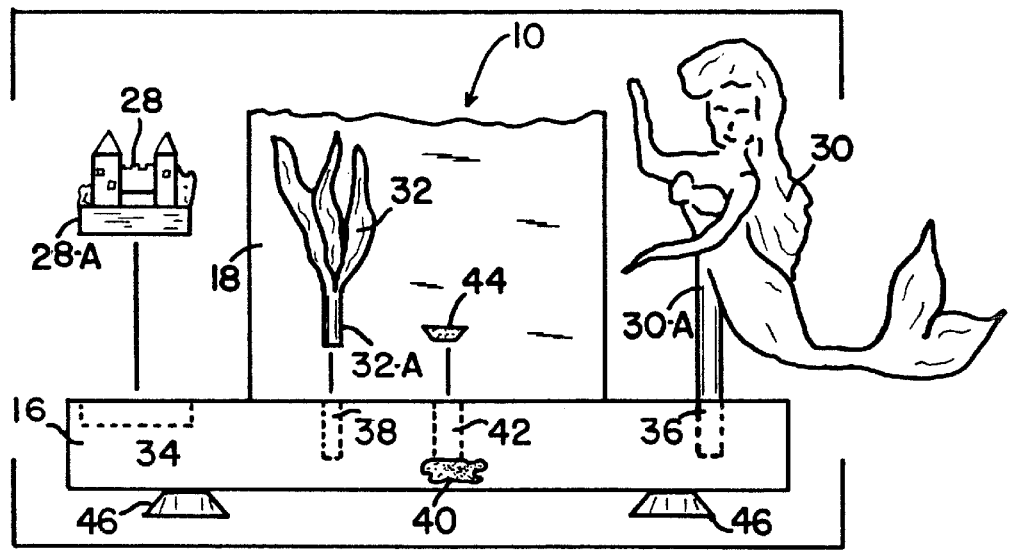

AQUARIUM ACCESSORY DEVICE

FIELD OF THE INVENTION

This invention substantially relates to devices that are used in conjunction with aquarium items. But more particularly pertains to a decorative accessory item that is removably positioned within an aquarium and functions as a blind for unsightly filters or heaters, etc. which become covered with algae.

BACKGROUND OF THE INVENTION

Aquariums are popular for many reasons, as they not only provide a safe haven for fish but they serve as a most suitable means to display the inhabitants therein. Thus typical aquariums are made of glass, plastic, "PLEXIGLASS", etc., so as to allow a person to easily watch the inhabitants without disrupting their lives. Therefore, it is a very important factor to maintain an aquarium in a clean condition, not only for good health of the inhabitants but also to provide an aesthetically pleasing appearance for viewers. Thus, most aquariums not only include the inhabitants, but they also include decorative items such as castles, rocks, plants, sunken ships, or the like.

Unfortunately, items situated within most aquariums become covered with algae and bacteria which tends to be most unsightly. Therefore, a caretaker of the aquarium must continually remove and clean the items and this tends to be very bothersome, irritating and extremely time consuming. This is especially true with regard to aeration devices such as filters, or devices used for controlling the temperature, such as heaters, both of which are typically used in aquariums. Unfortunately, removal of the entire device is usually necessary for cleaning, including any attached hoses or clamps, and this further complicates cleaning.

Therefore, the applicants contend that there is a great need for a device which would ease maintenance for a caretaker of an aquarium, and such a device should also be aesthetically pleasing to the eye. Furthermore, the device should be portable, easily installed or removed, and function substantially as an esthetically pleasing blind used for concealing unsightly items located within an aquarium.

SUMMARY OF THE INVENTION

It is therefore an object of the present invention to provide an aquarium accessory device that may be used to obscure from visual view an unsightly item located within an aquarium, such as a heater, a filter, or the like.

It is another object of the present invention to provide an aquarium accessory device which is of simple construction and economical to produce.

Yet another object of the present invention to provide an aquarium accessory device which includes a base that may be used to secure the device in place.

Also another object of the present invention to provide an aquarium accessory device which may include a weight located within the above noted base.

Still a further object of the present invention to provide an aquarium accessory device which may include removable items, such as plants, or a castle, etc.

Another very important object of the present invention to provide an aquarium accessory device that is easily removed for cleaning purposes.

Yet another object of the present invention to provide an aquarium accessory device having an internal compartment which is of a shape and size to slidably receive different decorative pictures therein. Also, if preferred each of the pictures may be reversible, having a different design on each opposing side.

Another object of the present invention to provide an aquarium accessory device which may be made from any suitable material of engineering choice, such as plastic, glass, PLEXIGLASS, etc, or even a combination of such materials.

Other objects and advantages will be seen when taken into consideration with the following specification and drawings.

BRIEF DESCRIPTION OF THE DRAWINGS

FIG. 3 is substantially a front view of a picture showing the picture in a first position.

FIG. 4 is substantially a front view of a picture showing the picture in a second position.

FIG. 5 is substantially a partial plan view of the present invention showing how various items may be removably attached thereon.

DETAILED DESCRIPTION OF THE DRAWINGS

Referring now in detail to the drawings wherein like characters refer to like elements throughout the various views.

The present invention is substantially an aquarium accessory device (10) and when positioned within an aquarium (12), the device (10) substantially functions as a blind for concealing algae covered items. For example, in FIG. 1 we show an aquarium (12) having a filter (14) therein, with the device (10) being removably positioned within the aquarium (12) substantially in front of the filter (14). Thus the device (10) effectively conceals the filter (14) without interfering with function of filter (14), and is esthetically very appealing.

Figure 1:
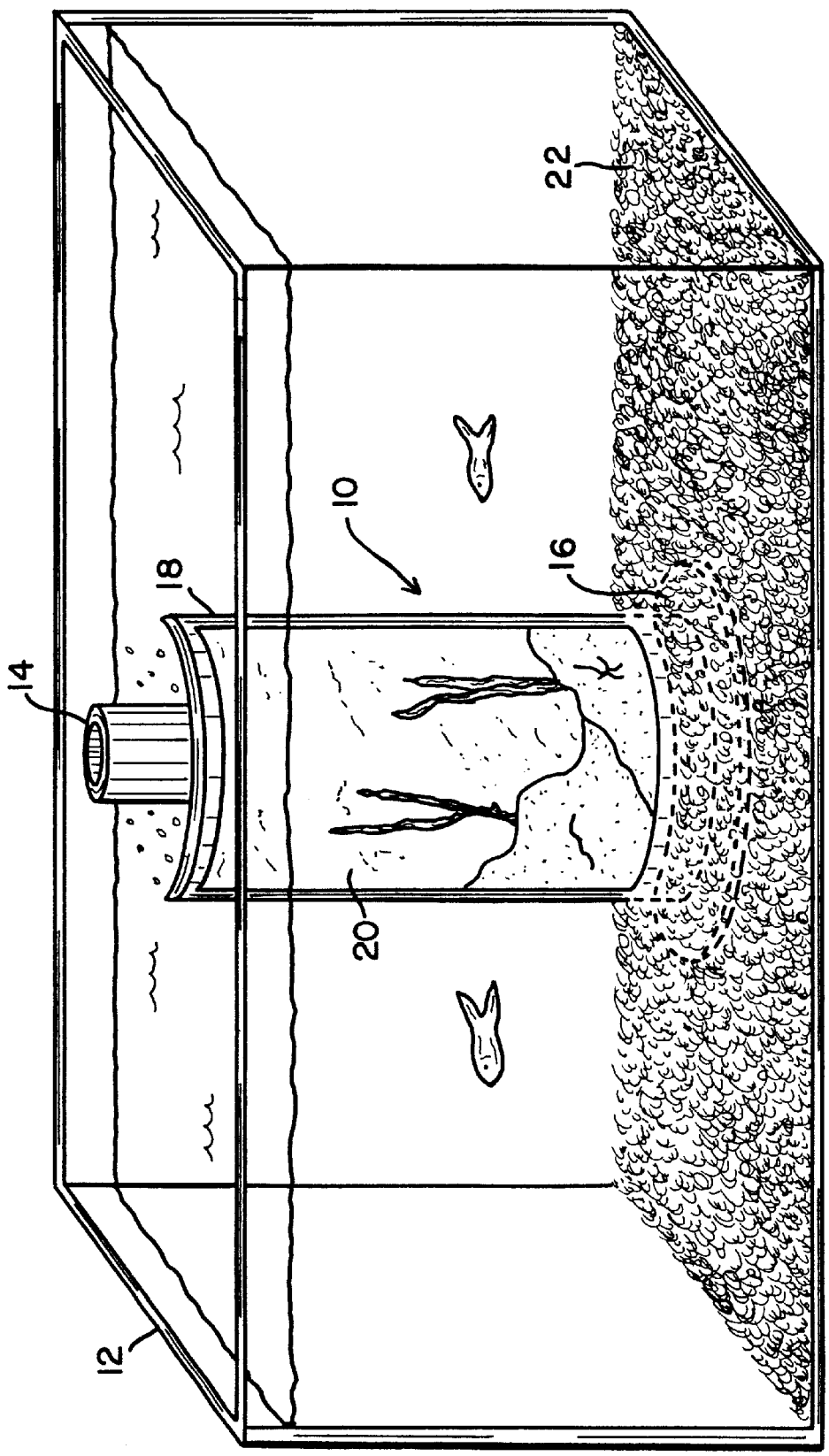
FIG. 1 is substantially an over view for the present invention.

Referring now to FIG. 1 which substantially depicts a first embodiment for the present invention. Wherein we show aquarium accessory device (10) comprising a support base (16) and an elongated vertical upright member (18), with upright member (18) being used for display of a decorative picture, which is later described.

It is to be understood support base (16) and elongated vertical upright member (18) may be manufactured separately if so desired, or as shown in the preferred embodiment, device (10) includes the support base (16) with elongated vertical upright member (18) being integrally formed at the point of manufacture. It is to be further understood that device (10) may be made from any suitable substantially transparent material of engineering choice, such as plastic, glass, PLEXI-GLASS, etc.

As depicted in FIG. 1, elongated vertical upright member (18) is made from either glass or plastic and the decorative picture (20) maybe silk-screened onto an exposed exterior surface of elongated vertical upright member (18). It is to be noted support base (16) is of a shape and size to provide sufficient support for elongated vertical upright member (18), and support base (16) maybe easily positioned beneath any typical decorative aquarium filler, such as gravel (22) which provides further support and conceals support base (16) for esthetic purposes.

Figure 2:
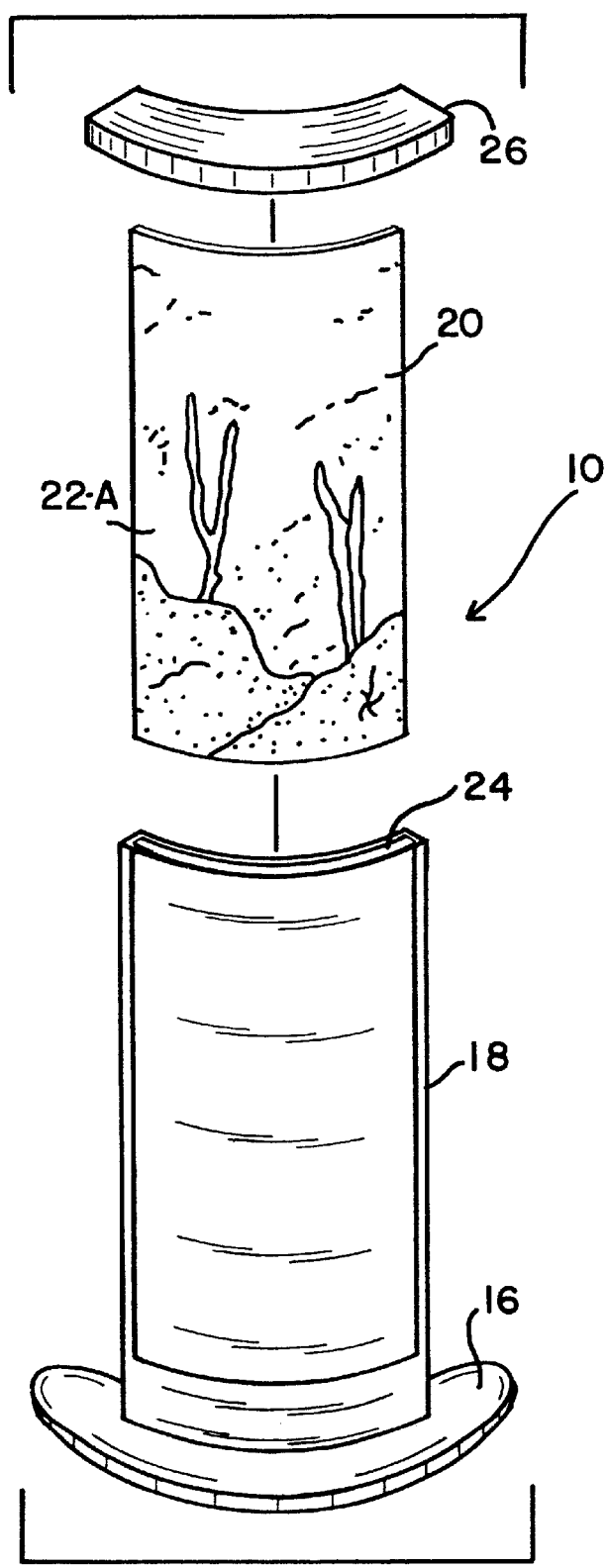
FIG. 2 is substantially a plan view showing a slightly different embodiment for the present invention.

Referring now to FIG. 2, wherein we show a slightly different embodiment for device (10) which includes elongated vertical upright member (18) having an internal compartment (24) which is used for slidably receiving decorative picture (20) therein. It is to be understood any suitable picture (20) may be used, and the picture can be made from any suitable material of engineering choice, such as paper, plastic, etc. However, if picture (20) is made from paper, then it is desirable for elongated upright member (18) to include a removable lid (26) which is functional for sealing the internal compartment (24) from intrusion of water. It is to be noted that if so desired lid (26) may also include a rubber type gasket, (not shown) which further inhibits accidental intrusion of water.

Further regarding picture (20), it may be desirous for picture (20) to be constructed in such a manner as to be reversible. Thus having a first side (20-A) and a second side (20-B) with the first side (20-A) depicting a first picture and the second side (20-B) depicting a second picture.

It is to be also understood device (10) can be substantially made in any suitable shape or size of engineering choice. For example, throughout the views we show support member (16), upright member (18) and picture (20) each being partially curved into substantially a C-shape. In this configuration, decorative picture (20) has a first installed position (see FIG. 3) that allows first picture (20-A) to be displayed in an upright position, and picture (20) has a second installed position (see FIG. 4) that allows second picture (20-B) to be displayed in an upright position. Therefore, it is to be understood each picture (20-A and 20-B) are substantially upside-down in relation to each other.

In FIG. 5, device (10) further includes multiple recesses which are used for frictionally receiving and supporting various items of engineering choice. Such items may include but are not limited to, a castle (28) having a bottom surface (28-A), a mermaid (30) having a support stand (30-A), and at least one plant (32) having a support stem (32-A), etc. Thus, device (10) includes at least one recess (34) which is of a shape and size to frictionally receive and support the bottom surface (28-A) of castle (28). Device (10) includes at least one recess (36) which is of a shape and size to frictionally receive and support the support stand (30-A) of mermaid (30), and device (10) includes at least one recess (38) which is of a shape and size to frictionally receive and support the stem (32-A) of plant (32).

Also shown in FIG. 5, support base (16) may further include an internal compartment (40) for containment of a substance, such as sand or the like. A fill hole (42) which is in open communication with internal compartment (40) and is used for filling the compartment (40) with the substance, and a cork (44) which is used for plugging fill hole (42).

It is to be understood the above additions provide weight means and support for increasing the overall weight and stability of device (10). However, the above weight means is only an example of one suitable way of providing such, and any other suitable means for increasing weight or stability of engineering choice may be incorporated.

Also illustrated within FIG. 5, device (10) may further include multiple suction-cups (46). Again, this is only an example of a suitable means for further securing the device (10) onto the bottom surface of aquarium (12).

We also include herein the following method for using aquarium accessory device (10) comprising of the following steps:

a. grasping aquarium accessory device (10);

b. grasping a decorative picture (20);

c. inserting decorative picture (20) into an internal compartment located on aquarium accessory device (10);

d. looking into aquarium (12) and choosing an item therein which is algae covered;

e. determining a desired location within aquarium (12) for situating aquarium accessory device (10) which will conceal the noted item; and;

f. positioning aquarium accessory device (10) into the desired location.

It is to be understood the above method may further include an additional step after "e" such as: displacing any gravel (22) from the bottom surface of aquarium (12) which is located at the desired location of device (10).

It is to be understood the above method may further include an additional step after "f" such as: displacing any gravel (22) from the bottom surface of aquarium (12) which is located at the desired location of device (10).

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described the invention what we claim as new and wish to secure by Letters Patent is:

1. An aquarium accessory device comprising: a support base member and an elongated vertical upright member, said support base member and said elongated vertical upright member being integrally formed, said elongated vertical upright member is made from a transparent material and said elongated vertical upright member includes an internal compartment for slidably receiving a decorative picture therein; wherein said internal compartment being sealed by a removable lid; wherein when said support base member and said elongated vertical upright member are positioned within an aquarium, said support base member and said elongated vertical upright member function as a blind for concealing algae covered items and said elongated vertical upright member is used for display of said decorative picture.

2. An aquarium accessory device comprising: a support base member and an elongated vertical upright member, said support base member and said elongated vertical upright member being integrally formed, each said member being made from either glass or plastic and a decorative picture is silk-screened onto an exposed exterior surface of said elongated vertical upright member, whereby:

when said support base member and said elongated vertical upright member are positioned within an aquarium, said support base member and said elongated vertical upright member function as a blind for concealing algae covered items and said elongated vertical upright member displays said decorative picture.

3. An aquarium accessory device comprising: a support base member and an elongated vertical upright member, said support base member and said elongated vertical upright member being integrally formed, said elongated vertical upright member being made from a transparent material, said elongated vertical upright member includes an internal compartment for slidably receiving a decorative picture therein, each said member and said decorative picture being partially curved into a C-shape, said decorative picture having a first installed position that allows a first picture to be displayed in an upright position, and said decorative picture having a second installed position that allows a second picture to be displayed in an upright position, whereby:

when said support base member and said elongated vertical upright member are positioned within an aquarium, said support base member and said elongated vertical upright member function as a blind for concealing algae covered items and said elongated vertical upright member is used for display of either said first picture or said second picture.

4. An aquarium accessory device comprising: a support base member and an elongated vertical upright member, said support base member and said elongated vertical upright member being integrally formed and said elongated vertical upright member being used for display of a decorative picture, said support base member having multiple recesses which are used for frictionally receiving and supporting various items, said various items include a castle having a bottom surface; a mermaid having a support stand; and at least one plant having a support stem; at least one of said multiple recesses being of a shape and size to frictionally receive and support said bottom surface of said castle, at least one of said multiple recesses being of a shape and size to frictionally receive and support said support stand of said mermaid, and at least one of said multiple recesses being of a shape and size to frictionally receive and support said stem of said plant, whereby:

when said support base member and said elongated vertical upright member are positioned within an aquarium, said support base member and said elongated vertical upright member function as a blind for concealing algae covered items and said elongated vertical upright member is used for display of said decorative picture.

5. An aquarium accessory device comprising: a support base member and an elongated vertical upright member, said support base member and said elongated vertical upright member being integrally formed, said elongated vertical upright member being used for display of a decorative picture, said support base having an internal compartment for containment of a substance, a fill hole which is in open communication with said internal compartment, and a cork for plugging said fill hole, whereby:

when said support base member and said elongated vertical upright member are positioned within an aquarium, said support base member and said elongated vertical upright member function as a blind for concealing algae covered items and said elongated vertical upright member is used for display of said decorative picture.

6. The device of claim 5 wherein said substance is sand.

7. An aquarium accessory device comprising: a support base member and an elongated vertical upright member, said support base member and said elongated vertical upright member being integrally formed, said elongated vertical upright member being used for display of a decorative picture, and said support base having multiple suction cups, whereby:

when said support base member and said elongated vertical upright member are positioned within an aquarium, said support base member and said elongated vertical upright member function as a blind for concealing algae covered items and said elongated vertical upright member is used for display of said decorative picture.

* * * * *